US009184683B2

(12) United States Patent
Hirono

(10) Patent No.: US 9,184,683 B2
(45) Date of Patent: Nov. 10, 2015

(54) APPLIED-VOLTAGE ELECTRICAL ANGLE SETTING METHOD FOR SYNCHRONOUS MOTOR, AND MOTOR CONTROL DEVICE

(75) Inventor: Daisuke Hirono, Isesaki (JP)

(73) Assignee: SANDEN CORPORATION, Gunma (JP)

( * ) Notice: Subject to any disclaimer, the term of this patent is extended or adjusted under 35 U.S.C. 154(b) by 167 days.

(21) Appl. No.: 14/115,194

(22) PCT Filed: Apr. 23, 2012

(86) PCT No.: PCT/JP2012/060868
§ 371 (c)(1),
(2), (4) Date: Nov. 1, 2013

(87) PCT Pub. No.: WO2012/153624
PCT Pub. Date: Nov. 15, 2012

(65) Prior Publication Data
US 2014/0070745 A1  Mar. 13, 2014

(30) Foreign Application Priority Data
May 10, 2011  (JP) ................................. 2011-104878

(51) Int. Cl.
H02P 6/00    (2006.01)
H02P 6/14    (2006.01)
H02P 6/16    (2006.01)
H02P 6/18    (2006.01)
H02P 23/00   (2006.01)
H02P 27/06   (2006.01)
(Continued)

(52) U.S. Cl.
CPC .............. *H02P 6/18* (2013.01); *H02P 21/0035* (2013.01); *H02P 25/021* (2013.01); *H02P 27/06* (2013.01)

(58) Field of Classification Search
CPC ........... H02P 6/182; H02P 6/185; H02P 6/18; H02P 6/20; H02P 6/085
USPC ............. 318/400.01, 400.04, 400.32, 400.34, 318/700
See application file for complete search history.

(56) References Cited

U.S. PATENT DOCUMENTS 4,088,934 A * 5/1978 D'Atre et al. ................. 318/802
5,650,708 A   7/1997 Sawada et al.
(Continued)

FOREIGN PATENT DOCUMENTS

JP    7-303302      11/1995
JP    2004-187407    7/2004
(Continued)

Primary Examiner — Bentsu Ro
Assistant Examiner — Gabriel Agared
(74) Attorney, Agent, or Firm — Cozen O'Connor

(57) ABSTRACT

An applied-voltage electrical angle setting method for a synchronous motor includes detecting applied voltage and current of the synchronous motor M, calculating current peak value Ip based on the detected values while calculating present applied voltage phase α, calculating target current phase βtarg based on the current peak value Ip followed by calculating target applied voltage phase αtarg corresponding to the target current phase in a target value setting unit 20, and calculating new applied voltage electrical angle instruction value θvtarg, based on change angle Δθv obtained by correcting a difference between the present applied voltage phase α and the target applied voltage phase αtarg by response time constant L/R of the synchronous motor, rotational speed ω calculated based on the applied voltage and the current, and the previous applied voltage electrical angle instruction value θvtarg, in a voltage electrical angle instruction value setting unit 10.

8 Claims, 3 Drawing Sheets

(51) Int. Cl.
  *H02P 21/00*     (2006.01)
  *H02P 25/02*     (2006.01)

(56) References Cited

U.S. PATENT DOCUMENTS

| | | | |
|---|---|---|---|
| 6,137,258 A * | 10/2000 | Jansen | 318/802 |
| 2004/0104704 A1* | 6/2004 | Hirono | 318/722 |
| 2006/0043921 A1* | 3/2006 | Nagura et al. | 318/700 |
| 2009/0066324 A1* | 3/2009 | Nagamoto | 324/207.25 |
| 2011/0043149 A1* | 2/2011 | Kitanaka | 318/400.26 |
| 2012/0086375 A1* | 4/2012 | Hirono | 318/400.34 |
| 2014/0049201 A1* | 2/2014 | Hirono | 318/400.23 |

FOREIGN PATENT DOCUMENTS

| | | |
|---|---|---|
| JP | 2009-100601 | 5/2009 |
| JP | 2011-10438 | 1/2011 |

\* cited by examiner

APPLIED-VOLTAGE ELECTRICAL ANGLE SETTING METHOD FOR SYNCHRONOUS MOTOR, AND MOTOR CONTROL DEVICE

RELATED APPLICATIONS

This application is a U.S. National Phase Application under 35 USC 371 of International Application PCT/JP2012/060868 filed Apr. 23, 2012.

This application claims the priority of Japanese application No. 2011-104878 filed May 10, 2011, the entire content of which is hereby incorporated by reference.

TECHNICAL FIELD

A technique relating to a position detecting operation of a synchronous motor is disclosed below.

BACKGROUND ART

In a sine wave drive system (180° energization system) whose application examples are increased as drive systems of synchronous motors (permanent magnet synchronous motors), a control of detecting a rotor position (a rotational position of the rotor) in a sensorless manner and performing the suitable energization to a stator coil is executed. As a motor control device having a function of detecting the rotor position in a sensorless manner, a motor control device disclosed in Patent Document 1 has been proposed. The motor control device of Patent Document 1 determines a voltage phase of an applied voltage by a phase current detecting means for detecting a phase current of a synchronous motor, a current phase calculating means for calculating a current phase based on the detected phase current, and a voltage phase setting means for adding a predetermined phase difference to the calculated current phase to convert it to a voltage phase. Moreover, the applied voltage to the synchronous motor is set based on the voltage phase, and a command voltage determined according to an operation command.

According to the motor control device of Patent Document 1, the phase instruction value of the applied voltage to be applied to the synchronous motor is set by adding a predetermined phase difference to the detected current phase. The phase difference to be added is calculated based on the detected current peak value, an angular velocity of an induced voltage, and a target current phase (lead angle from a q-axis), or is obtained by referring to a data table from the current peak value and the angular velocity of the induced voltage.

CITATION LIST

Patent Document

Patent Document 1: Japanese Laid-open (kokai) Patent Application Publication No. 2004-187407

SUMMARY OF THE INVENTION

Problems to be Solved by the Invention

In general, when the voltage phase of the applied voltage is changed in the synchronous motor, the current phase also changes according to a motor characteristic formula of the following Formula 1. Formula 1 is a formula based on a motor vector diagram of a rotor coordinate system, symbol Ed is a d-axis component of an induced voltage E, symbol Eq is a q-axis component of the induced voltage E, symbol Vd is a d-axis component of the applied voltage V, symbol Vq is a q-axis component of the applied voltage V, symbol R is a resistance of a stator coil, symbol Id is a d-axis component of a current I, symbol Iq is a q-axis component of the current I, symbol ω is a rotational speed, symbol Ld is a d-axis inductance, symbol Lq is a q-axis inductance, symbol ψa is a magnetic flux of a rotor magnet, and symbol p is a differential operator (d/dt).

$$\underbrace{\begin{pmatrix} Ed = Vd - R \cdot Id \\ Eq = Vq - R \cdot Iq \end{pmatrix} = \begin{pmatrix} 0 & -\omega Lq \\ \omega Ld & 0 \end{pmatrix}\begin{pmatrix} Id \\ Iq \end{pmatrix} + \begin{pmatrix} 0 \\ \omega \psi a \end{pmatrix} +}_{A}$$

$$\underbrace{\begin{pmatrix} pLd \cdot Id \\ 0 \end{pmatrix} + \begin{pmatrix} 0 \\ pLq \cdot Iq \end{pmatrix}}_{B}$$ [Formula 1]

In Formula 1, response characteristics of the position detecting operation, in which the rotation of the synchronous motor is stable, can be expressed by a portion A of the formula. On the other hand, in the response characteristics of the position detecting operation in which the rotation of the synchronous motor is in a transient state due to the load fluctuation of the output shaft, a calculation formula of a portion B of the formula is joined in addition to the portion A. In other words, a response delay occurs according to an L/R time constant (L: inductance, R: coil resistance). When continuing the position detecting operation while ignoring the response delay, the actual rotation of the rotor cannot catch up with the phase instruction value of the applied voltage, which leads to oscillation of the instruction value and a loss of synchronism.

In the motor control device as disclosed in Patent Document 1, since the response delay as described above is not added to the phase difference to be applied to the detected current phase so as to generate a phase instruction value of the applied voltage, there is room for improvement in stability of the operation, particularly when entering a transient state. In view of this point, it is necessary that the instruction value of the applied voltage can be set in consideration of the response delay due to the motor characteristics.

Means for Solving the Problems

For the above-described problems, an applied-voltage electrical angle setting method for a synchronous motor is suggested. According to a first aspect, there is provided an applied-voltage electrical angle setting method, the method including detecting an applied voltage that is applied to a stator coil and a current flowing through the stator coil according to the applied voltage; calculating a present applied voltage phase (or an applied voltage electrical angle) and calculating a current peak value based on the detected applied voltage and current, and calculating a target current phase based on the current peak value followed by calculating a target applied voltage phase (or a target applied voltage electrical angle) corresponding to the target current phase; and calculating a new applied voltage electrical angle instruction value, based on a change angle obtained by correcting a difference between the present applied voltage phase (or applied voltage electrical angle) and the target applied voltage phase (or target applied voltage electrical angle) by a response time constant of the synchronous motor, a rotational speed calculated based on the detected applied voltage and current, and the previous applied voltage electrical angle instruction value.

A motor control device suggested so as to carry out the applied-voltage electrical angle setting method includes a current detecting unit that detects a current flowing through a stator coil of a synchronous motor; an applied voltage detecting unit that detects an applied voltage to be applied to the stator coil; a current peak value and electrical angle detecting unit that detects a current peak value and a current electrical angle based on the current detected by the current detecting unit; an induced voltage peak value and electrical angle detecting unit that detects an induced voltage peak value and an induced voltage electrical angle, based on the current detected by the current detecting unit and the applied voltage detected by the applied voltage detecting unit; a rotor position detecting unit that detects a rotor position of the synchronous motor, using a rotor position calculation formula which includes the current electrical angle or the induced voltage electrical angle as a variable, and includes a current phase or an induced voltage phase obtained based on at least two of the current peak value, the induced voltage peak value, and a difference between the induced voltage electrical angle and the current electrical angle as a variable; a rotational speed detecting unit that detects the rotational speed based on the rotor position detected by the rotor position detecting unit; a target value setting unit that calculates a target current phase based on a current peak value detected by the phase current peak value and electrical angle detecting unit, and calculates a target applied voltage phase (or a target applied voltage electrical angle) based on the target current phase; and a voltage electrical angle instruction value setting unit that calculates a new applied voltage electrical angle instruction value, based on a change angle obtained by obtaining a difference between the present applied voltage phase (or applied voltage electrical angle) calculated based on the applied voltage detected by the applied voltage detecting unit and the target applied voltage phase (or target applied voltage electrical angle) and correcting the difference by a response time constant of the synchronous motor, a rotational speed detected by the rotational speed detecting unit, and the previous applied voltage electrical angle instruction value.

Furthermore, according to a second aspect suggested for the above-described problem, there is provided an applied-voltage electrical angle setting method, the method including detecting an applied voltage to be applied to a stator coil and a current flowing through the stator coil according to the applied voltage; calculating an amount of flux linkage variation corresponding to a difference between a present flux linkage of a rotor and a target flux linkage corresponding to a target current phase based on the detected applied voltage and current; calculating a change angle based on a rotational speed calculated based on the detected applied voltage and current, and the amount of flux linkage variation; and calculating a new applied voltage electrical angle instruction value based on the calculated rotational speed, the change angle, and the previous applied voltage electrical angle instruction value.

A motor control device suggested so as to carry out the applied-voltage electrical angle setting method includes a current detecting unit that detects a current flowing through a stator coil of a synchronous motor; an applied voltage detecting unit that detects an applied voltage to be applied to the stator coil; a current peak value and electrical angle detecting unit that detects a current peak value and a current electrical angle based on the current detected by the current detecting unit; an induced voltage peak value and electrical angle detecting unit that detects an induced voltage peak value and an induced voltage electrical angle, based on the current detected by the current detecting unit and the applied voltage detected by the applied voltage detecting unit; a rotor position detecting unit that detects a rotor position of the synchronous motor, using a rotor position calculation formula that includes the current electrical angle or the induced voltage electrical angle as a variable, and includes a current phase or an induced voltage phase obtained based on at least two of the current peak value, the induced voltage peak value, and a difference between the induced voltage electrical angle and the current electrical angle as a variable; a rotational speed detecting unit that detects a rotational speed based on the rotor position detected by the rotor position detecting unit; a target value setting unit that calculates a target d-axis current based on the current peak value; and a voltage electrical angle instruction value setting unit that calculates a d-axis current difference between a present d-axis current obtained based on the current peak value and the current phase and the target d-axis current, calculates an amount of flux linkage variation of a rotor corresponding to the d-axis current difference, and computes a new applied voltage electrical angle instruction value based on a change angle calculated based on the amount of flux linkage variation and the rotational speed, the rotational speed, and the previous applied voltage electrical angle instruction value.

Effects of the Invention

According to the first aspect, since the change angle of the new applied voltage electrical angle instruction value relative to the previous instruction value is corrected by the response time constant of the synchronous motor, the applied voltage electrical angle instruction value is updated, while maintaining the suitable response speed according to the response characteristics of the synchronous motor.

Furthermore, according to the second aspect, the applied voltage electrical angle instruction value is updated based on the amount of the magnetic flux variation. Since the target flux linkage is a magnetic flux when being operated at the target current phase and since a relation of the voltage=the number of revolutions×flux holds in general, if the control of the applied voltage phase is performed so as to increase the rotational speed by an amount equivalent to the amount of the magnetic flux variation, the current phase reaches a target phase as a result. Since the synchronous motor itself acts as a filter of the response delay, the response characteristics of the current at this time do not need to be taken into account for the response delay. Therefore, the applied voltage electrical angle instruction value is updated, while maintaining the suitable response speed according to the response characteristics of the synchronous motor.

DESCRIPTION OF EMBODIMENTS

Figure 1:
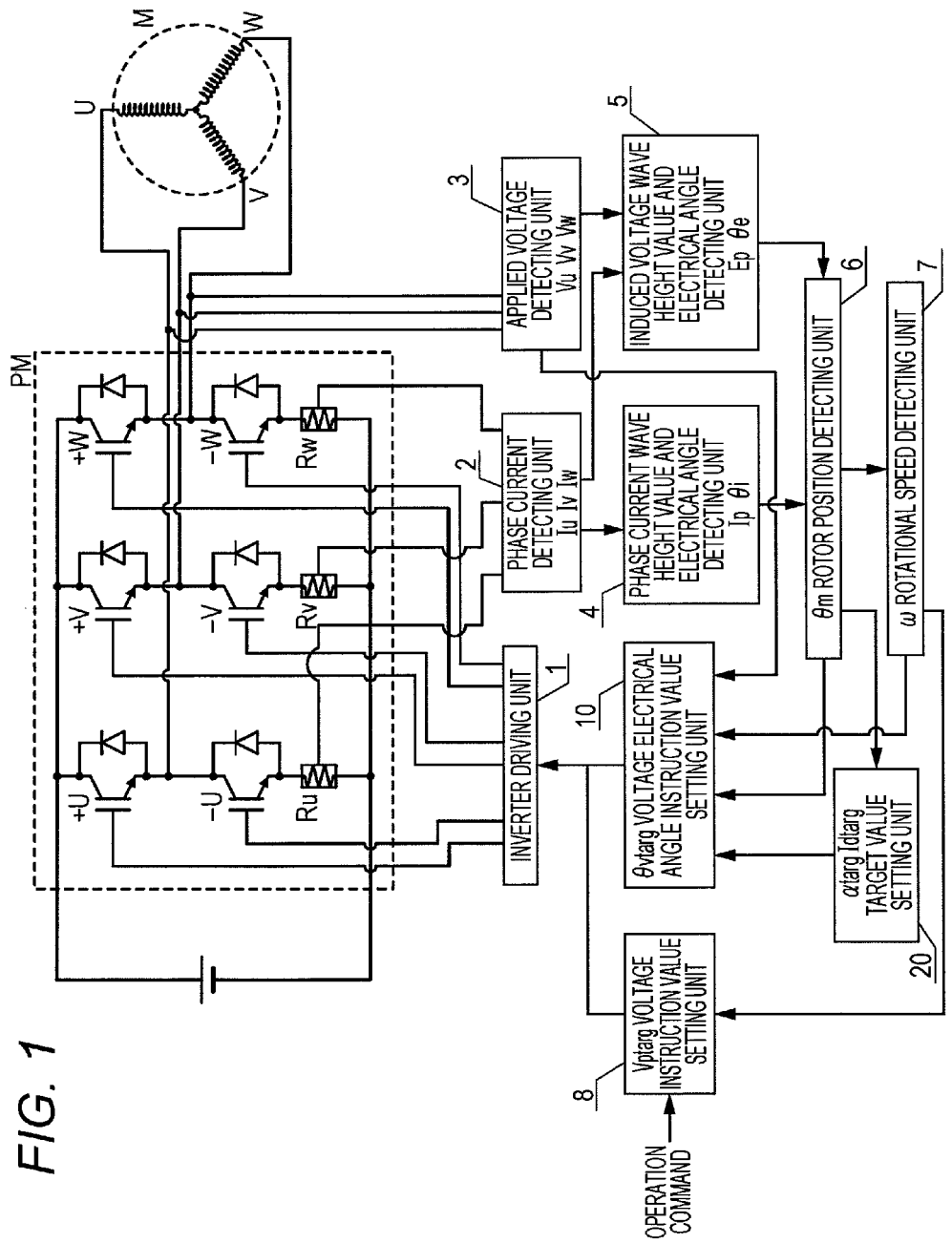
FIG. 1 is a block diagram illustrating an embodiment of a motor control device.

FIG. 1 illustrates an embodiment of the motor control device.

A synchronous motor M of this embodiment is a three-phase star connection type, and has a stator including U-phase, V-phase, and W-phase stator coils, and a rotor including a permanent magnet. FIG. 1 illustrates only each of the U-phase, V-phase, and W-phase stator coils, and does not illustrate others. In addition, although the star connection type is illustrated as an example, a delta connection is also equally applied.

A power module (IPM) PM for driving the synchronous motor M is configured so that switching elements +U, +V, and +W of an upper arm side, and switching elements −U, −V, and −W of a lower arm side are connected in series between a high order side and a low order side of a DC power supply for the U-phase, V-phase, and W-phase, respectively. Furthermore, on the low order side of the switching elements −U, −V, and −W of the lower arm side, shunt resistors Ru, Rv, and Rw for detecting the current flowing through the respective phases are provided. Each of the switching elements +U to −W is driven by a PWM signal due to an inverter driving unit 1, and each of the U-phase, V-phase, and W-phase stator coils is controlled by sine wave energization accordingly (180° energization). Current flowing through the respective phases U, V, and W by the control is detected using the shunt resistors Ru, Rv, and Rw.

In the case of this embodiment, the inverter driving unit 1 and each of units to be described below will be described as being performed by a computer such as a microcomputer that operates according to programs. However, it is also possible to form each unit by hardware, without being limited thereto.

A phase current detecting unit 2 corresponding to the current detecting unit detects a U-phase current Iu flowing through the U-phase stator coil, a V-phase current Iv flowing through the V-phase stator coil, and a W-phase current Iw flowing through the W-phase stator coil, respectively, by measuring the voltages applied to the shunt resistors Ru, Rv, and Rw. An applied voltage detecting unit 3 corresponding to the applied voltage detecting unit detects a U-phase applied voltage Vu, a V-phase applied voltage Vv, and a W-phase applied voltage Vw that are applied to the U-phase stator coil, the V-phase stator coil, and the W-phase stator coil, respectively, from the upper arm side switching elements +U to +W.

A phase current peak value and electrical angle detecting unit 4 corresponding to the current peak value and electrical angle detecting unit detects a phase current peak value Ip and a phase current electrical angle θi (a stator αβ coordinate system), based on the values of phase currents Iu, Iv, and Iw detected by the phase current detecting unit 2. The detecting method is as follows. The detecting method is described in detail in Japanese Laid-open (kokai) Patent Application Publication No. 2011-10438 (hereinafter, referred to as Reference 1).

Figure 2:
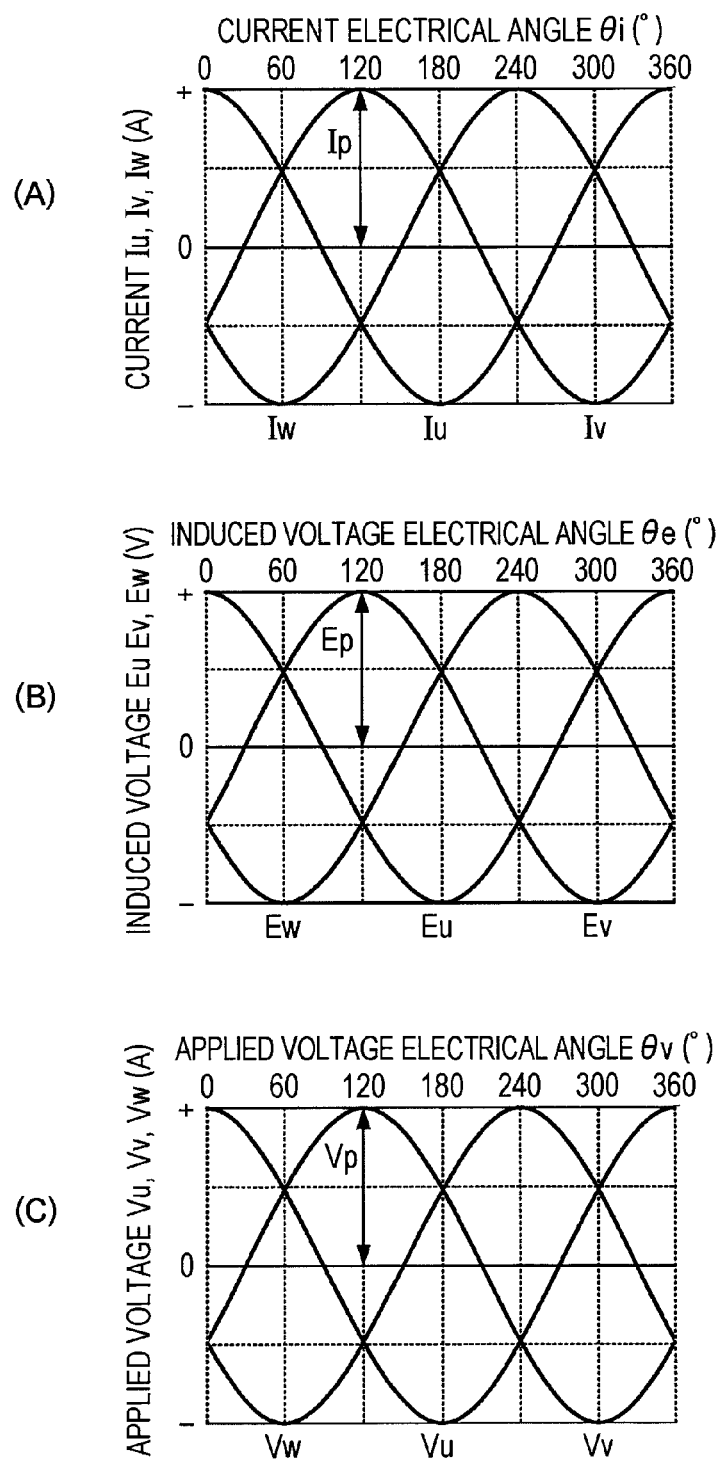
FIGS. 2A to 2C are waveform diagrams of (2A) a current, (2B) an induced voltage, and (2C) an applied voltage, respectively, in a sine wave energization.

A phase current waveform diagram when performing the sine wave energization to U-phase, V-phase, and W-phase is as illustrated in FIG. 2A, and there are phase differences of 120° among the U-phase current Iu, the V-phase current Iv, and the W-phase current Iw each forming the sine waveform. When viewed from this phase current waveform diagram, the following Formula 2 holds among the phase currents Iu, Iv, and Iw, the phase current peak value Ip, and the phase current electrical angle θi. The phase current peak value and electrical angle detecting unit 4 obtains the phase current peak value Ip and the phase current electrical angle θi by Formula 2 by utilizing the U-phase current Iu, the V-phase current Iv, and the W-phase current Iw that are detected by the phase current detecting unit. 2

$$Iu = Ip \times \cos(\theta i)$$

$$Iv = Ip \times \cos(\theta i - \tfrac{2}{3}\pi)$$

$$Iw = Ip \times \cos(\theta i + \tfrac{2}{3}\pi) \quad \text{[Formula 2]}$$

An induced voltage peak value and electrical angle detecting unit 5 corresponding to the induced voltage peak value and electrical angle detecting unit detects an induced voltage peak value Ep and an induced voltage electrical angle θe (stator αβ coordinate system), based on the phase currents Iu, Iv, and Iw detected by the phase current detecting unit 2, and the applied voltages Vu, Vv, and Vw detected by the applied voltage detecting unit 3. The detecting method is as follows. The detecting method is also described in detail in Reference 1.

An induced voltage waveform diagram when performing the sine wave energization to U-phase, V-phase and W-phase is as illustrated in FIG. 2B, and there are phase differences of 120° among a U-phase induced voltage Eu, a V-phase induced voltage Ev, and a W-phase induced voltage Ew, each forming a sine waveform. When viewed from this induced voltage waveform diagram, the following Formula 3 holds among the induced voltages Eu, Ev, and Ew, the induced voltage peak value Ep, and the induced voltage electrical angle θe.

$$Eu = Ep \times \cos(\theta e)$$

$$Ev = Ep \times \cos(\theta e - \tfrac{2}{3}\pi)$$

$$Ew = Ep \times \cos(\theta e + \tfrac{2}{3}\pi) \quad \text{[Formula 3]}$$

On the other hand, the following Formula 4 holds among the applied voltages Vu, Vv, and Vw, the phase currents Iu, Iv, and Iw, resistance values Rcu, Rcv, and Rcw (known as motor parameters) of the stator coil, and the induced voltages Eu, Ev, and Ew.

$$Vu - Iu \times Rcu = Eu$$

$$Vv - Iv \times Rcv = Ev$$

$$Vw - Iw \times Rcw = Ew \quad \text{[Formula 4]}$$

The induced voltage peak value and electrical angle detecting unit 5 obtains the U-phase induced voltage Eu, the V-phase induced voltage Ev, and the W-phase induced voltage Ew from Formula 4, based on the U-phase current Iu, the V-phase current Iv, and the W-phase current Iw detected by the phase current detecting unit 2, and the U-phase applied voltage Vu, the V-phase applied voltage Vv, and the W-phase applied voltage Vw detected by the applied voltage detecting unit 3, and obtains the induced voltage peak value Ep and the induced voltage electrical angle θe from Formula 3, based on the obtained U-phase induced voltage Eu, the V-phase induced voltage Ev, and the W-phase induced voltage Ew.

A rotor position detecting unit 6 corresponding to the rotor position detecting unit detects a rotor position θm (an angle of d-axis with respect to α-axis), based on the phase current peak value Ip and the phase current electrical angle θi detected by the phase current peak value and electrical angle detecting unit 4, and the induced voltage peak value Ep and the induced voltage electrical angle θe detected by the induced voltage peak value and electrical angle detecting unit 5. That is, the rotor position θm of the synchronous motor M is detected by using a rotor position calculation formula that includes the current electrical angle θi or the induced voltage electrical angle θe as a variable, and includes a current phase β or an induced voltage phase γ obtained based on at least two of the current peak value Ip, the induced voltage peak value Ep, and the difference [θe−θi] between the induced voltage electrical angle θe and the current electrical angle θi as a variable (see Reference 1 for details).

Among them, a first detecting method of using a rotor position calculation formula including the phase current electrical angle θi, and the current phase β based on the phase current peak value Ip and [induced voltage electrical angle θe–phase current electrical angle θi] as a variable, and a second detecting method of using a rotor position calculation formula including the induced voltage electrical angle θe, and an induced voltage phase γ based on the phase current peak value Ip and [induced voltage electrical angle θe–phase current electrical angle θi] as a variable, will be described in detail.

(1) First Detecting Method

In the first detecting method, the rotor position calculation formula including the detected phase current electrical angle θi and the current phase β as variables is the following Formula 5.

$$\theta m = \theta i - 90°$$ [Formula 5]

The current phase β in Formula 5 is selected by referring to a previously prepared data table using the phase current peak value Ip and [induced voltage electrical angle θe–phase current electrical angle θi] as parameters. The data table has been prepared as follows and stored in memory.

Figure 3:
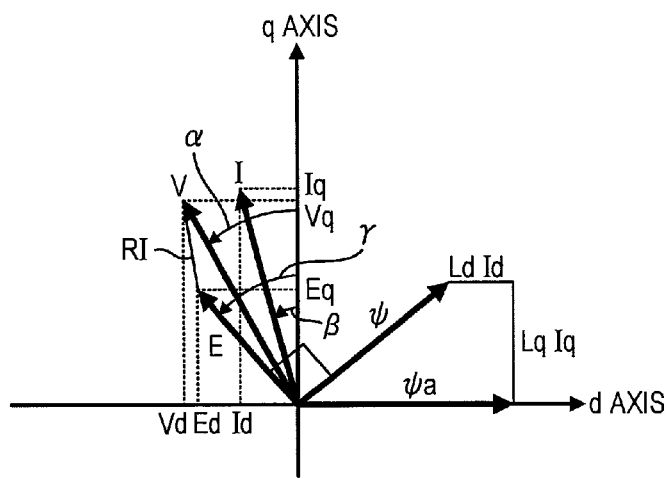
FIG. 3 is a motor vector diagram of a rotor (dq) coordinate system.

In regard to the data table creation, FIG. 3 illustrates a motor vector diagram when the rotor of the synchronous motor M is rotating, and a relation among the applied voltage V (Vu to Vw), the current I (Iu to Iw), and the induced voltage E (Eu to Ew) is expressed by vectors in a d-q coordinate. The induced voltage E is expressed by $[\omega\Psi]$. Furthermore, in FIG. 3, symbol Vd is a d-axis component of the applied voltage V, symbol Vq is a q-axis component of the applied voltage V, symbol Id is a d-axis component of the current I, symbol Iq is a q-axis component of the current I, symbol Ed is a d-axis component of the induced voltage E, and symbol Eq is a q-axis component of the induced voltage E. Furthermore, the voltage phase based on the q-axis is α, the current phase based on the q-axis is β, and the induced voltage phase based on the q-axis is γ. Symbol ψa in FIG. 3 is a magnetic flux of the permanent magnet of the rotor, symbol Ld is a d-axis inductance, symbol Lq is a q-axis inductance, symbol R is a resistance value (Rcu to Rcw) of the stator coil, and symbol ψ is a total flux linkage of the rotor.

When viewed from this motor vector diagram, Formula 6 holds when the rotational speed of the rotor is set as ω, and Formula 7 holds when the value concerning ω is transferred from the right side of Formula 6 to the left side thereof.

$$\begin{pmatrix} Vd \\ Vq \end{pmatrix} = \begin{pmatrix} R & -\omega Lq \\ \omega Ld & R \end{pmatrix} \begin{pmatrix} Id \\ Iq \end{pmatrix} + \begin{pmatrix} 0 \\ \omega\psi a \end{pmatrix}$$ [Formula 6]

$$\begin{pmatrix} Ed/\omega = (Vd - Id \times R)/\omega \\ Eq/\omega = (Vq - Iq \times R)/\omega \end{pmatrix} = \begin{pmatrix} 0 & -Lq \\ Ld & 0 \end{pmatrix} \begin{pmatrix} Id \\ Iq \end{pmatrix} + \begin{pmatrix} 0 \\ \psi a \end{pmatrix}$$ [Formula 7]

The data table is created in advance based on holding of Formulas 6 and 7 under the motor vector diagram of FIG. 3. That is, while progressively increasing the current phase β and the current I illustrated in the motor vector diagram within respective predetermined ranges, the current phase β when [induced voltage phase γ–current phase β] becomes a predetermined value is saved, to thereby create a data table of the current phase β in which the phase current peak value Ip corresponding to the current I, and [induced voltage electrical angle θe–phase current electrical angle θi] corresponding to [induced voltage phase γ–current phase β] are set as parameters.

Specifically, for example, as illustrated in FIG. 5 of Reference 1, while increasing the current phase β from −180° to 180° by 0.001°, and, increasing the current I from 0 A to 64 A by 1 A, the voltage phase α, the current phase β, and the induced voltage phase γ based on the motor vector diagram are obtained by using the d-axis inductance Ld and the q-axis inductance Lq intrinsic to the synchronous motor M. Moreover, the current phase β when [induced voltage phase γ–current phase β] is 1°, 2°, 3°, . . . is saved. Thus, a data table of the current phase β is created in which the phase current peak value Ip corresponding to the current I is set as one parameter, and [induced voltage electrical angle θe–phase current electrical angle θi] corresponding to [induced voltage phase γ–current phase β] is set as another parameter.

When the current phase β and the phase current electrical angle θi selected from the data table are inserted into Formula 5 of the rotor position calculation formula, the rotor position θm is detected.

(2) Second Detecting Method

In the second detecting method, the rotor position calculation formula including the detected induced voltage electrical angle θe and the induced voltage phase γ as variables is the following Formula 8.

$$\theta m = \theta e - \gamma - 90°$$ [Formula 8]

The induced voltage phase γ in Formula 8 is selected by setting the phase current peak value Ip and [induced voltage electrical angle θe–phase current electrical angle θi] as parameters and referring to the data table prepared in advance. The data table has been prepared as follows and stored in memory.

The data table of this case is also created in advance based on holding of Formulas 6 and 7 under the motor vector diagram of FIG. 3. That is, while progressively increasing the current phase β and the current I illustrated in the motor vector diagram within respective predetermined ranges, the induced voltage phase γ when [induced voltage γ–current phase β] becomes a predetermined value is stored, to thereby create a data table of the induced voltage phase γ in which the phase current peak value Ip corresponding to the current I and [induced voltage electrical angle θe–phase current electrical angle θi] corresponding to [induced voltage phase γ–current phase β] are set as parameters.

Specifically, in the same manner as described above, while increasing the current phase β from −180° to 180° by 0.001° and increasing the current I from 0 A to 64 A by 1 A, the voltage phase α, the current phase β, and the induced voltage phase γ based on the motor vector diagram are obtained by using the d-axis inductance Ld and the q-axis inductance Lq intrinsic to the synchronous motor M. Moreover, the induced voltage phase γ when [induced voltage γ–phase current phase β] is 1°, 2°, 3°, . . . is saved. Thus, the data table of the induced voltage phase γ is created in which the phase current peak value Ip corresponding to the current I is set as one parameter, and [induced voltage electrical angle θe–phase current electrical angle θi] corresponding to [induced voltage phase γ–current phase β] is set as another parameter.

When the induced voltage phase γ and the induced voltage electrical angle θe selected from the data table are inserted to Formula 8 of the rotor position calculation formula, the rotor position θm is detected.

According to the rotor position detecting unit 6 configured to perform the above-described first and second detecting methods, since the rotor position θm is directly obtained by using the rotor position calculation formula described above, it is possible to accurately detect the rotor position θm in the position detecting operation. Furthermore, since the method of selecting the current phase β or the induced voltage phase γ as one of the variables included in the rotor calculation formula from the data table prepared in advance is employed, a processing load is lower than a case of obtaining the current phase β or the induced voltage phase γ by calculation each time. However, as long as the processing load may not be considered, it is also possible to calculate the variables by calculation each time.

In the first and second detecting methods described above, as an example of data table, there has been described a table that selects the current phase β or the induced voltage phase γ by setting the phase current peak value Ip and [induced voltage electrical angle θe–phase current electrical angle θi] as parameters. In addition to this, it is also possible to use one of a data table that selects the current phase β or the induced voltage phase γ by setting the induced voltage peak value Ep and [induced voltage electrical angle θe–phase current electrical angle θi] as parameters, a data table that selects the current phase β or the induced voltage phase γ by setting the phase current peak value Ip and the induced voltage peak value Ep as parameters, or a data table that selects the current phase β or the induced voltage phase γ by setting the phase current peak value Ip, the induced voltage peak value Ep, and [induced voltage electrical angle θe–phase current electrical angle θi] as parameters.

The rotor position θm detected by the rotor position detecting unit 6 as described above is input to a rotational speed detecting unit 7 corresponding to the rotational speed detecting unit. The rotational speed detecting unit 7 detects the rotational speed ω by dθm/dt based on the rotor position θm detected by the rotor position detecting unit 6. In regard to dθm/dt at this time, considering that the filter of L/R is adopted for the angle correction as described later, similarly, a filter equal to or slower than L/R is preferably adapted.

A voltage instruction value setting unit 8 functioning as a voltage instruction value setting unit sets a voltage instruction value (voltage peak value) Vptarg of the applied voltage based on a command rotational speed included in an operation command to be input from the outside and the rotational speed ω detected by the rotational speed detecting unit 7, and provides the voltage instruction value to the inverter driving unit 1. It is preferred that the response speed of the voltage instruction value Vptarg be set to responsiveness sufficiently slower than the filter used when calculating the rotational speed ω for preventing oscillation between ω and the Vptarg.

Meanwhile, an applied voltage electrical angle instruction value θvtarg as another instruction value provided to the inverter driving unit 1 is set according to a first setting method or a second setting method described below, by a voltage electrical angle instruction value setting unit 10 corresponding to the voltage electrical angle instruction value setting unit.

In the setting method described below, the position detecting operation for controlling the current phase to the target phase is executed because of excellent motor efficiency. That is, in order to set the current phase to the target phase, the voltage electrical angle of the applied voltage is updated at every control period. In this case, especially in the transient state, since the response delay due to the L/R time constant (B portion of Formula 1) of the synchronous motor M illustrated in Formula 1 described above occurs until the current phase changes in response to a change in the voltage phase, when the variation width of the applied voltage electrical angle instruction value θvtarg is not adjusted in consideration of the response characteristics, the oscillation of the instruction value or the loss of synchronization occurs. The voltage electrical angle instruction value setting unit 10 illustrated below configured to perform the first setting method and the second setting method performs the computation considering the response characteristics.

(A) First Setting Method

First, as described above, the applied voltages Vu, Vv, and Vw applied to the stator coil of the synchronous motor M are detected by the applied voltage detecting unit 3, and the phase currents Iu, Iv, and Iw are detected by the phase current detecting unit 2. Moreover, based on the detected phase currents Iu, Iv, and Iw, and applied voltages Vu, Vv, and Vw, the current peak value Ip and the phase current electrical angle θi are detected by the phase current peak value and electrical angle detecting unit 4, and the induced voltage peak value Ep and the induced voltage electrical angle θe are detected by the induced voltage peak value and electrical angle detecting unit 5. Based on the detected phase current peak value Ip, the phase current electrical angle θi, the induced voltage peak value Ep, and the induced voltage electrical angle θe, the rotor position θm is detected by the rotor position detecting unit 6. In addition, in the voltage electrical angle instruction value setting unit 10, the present applied voltage phase α is calculated based on the detected applied voltages Vu, Vv, and Vw. The present applied voltage phase α can be calculated in the following manner.

With respect to phase applied voltage waveforms when performing the sine wave energization to U-phase, V-phase, and W-phase, as in the case of the phase current and the induced voltage described above, as illustrated in FIG. 2C, there are phase differences of 120° among the U-phase applied voltage current Vu, the V-phase voltage applied Vv, and the W-phase applied voltage Vw each forming a sine waveform. When viewed from the applied voltage waveforms, the following Formula 9 holds among the applied voltages Vu, Vv, and Vw of the respective phases, the applied voltage peak value Vp, and the applied voltage electrical angle θv. The voltage electrical angle instruction value setting unit 10 obtains the applied voltage peak value Vp and the applied voltage electrical angle θv by Formula 9 by using the U-phase applied voltage Vu, the V-phase applied voltage Vv, and the W-phase applied voltage Vw detected by the applied voltage detecting unit 3. This computation may be performed by the rotor position detecting unit 6 or the like.

$$Vu = Vp \times \cos(\theta v)$$

$$Vv = Vp \times \cos(\theta v - 2/3 \cdot \pi)$$

$$Vw = Vp \times \cos(\theta v + 2/3 \cdot \pi) \qquad \text{[Formula 9]}$$

Since the current phase β and the current electrical angle θi are calculated as described above by the rotor position detecting unit 6, the voltage electrical angle instruction value setting unit 10, which receives the current phase β and the current electrical angle θi from the rotor position detecting unit 6, computes the present applied voltage phase α according to the following Formula 10 below, based on the calculated applied voltage electrical angle θv.

$$\alpha = +\theta v - \theta i \qquad \text{[Formula 10]}$$

On the other hand, a target value setting unit 20 corresponding to the target value setting unit receives the current peak value Ip detected by the phase current peak value and electrical angle detecting unit 4 through the rotor position detecting unit 6, and calculates a target current phase βtarg based on the present current peak value Ip. At this time, since the present current phase β is calculated in the rotor position detecting unit 6, the current peak value Ip and the present q-axis current Iq (q-axis component of the current peak value Ip) presumed from the current phase β may be used for a calculation of the target current phase βtarg. In all cases, there is no change in calculating the target current phase βtarg based on the current peak value Ip detected by the phase current peak value and electrical angle detecting unit 4. The target value setting unit 20 has a data table created in advance from the known parameters of the synchronous motor M and stored in the memory, and the data table includes an optimal current lead angle (=target current phase βtarg) at which the efficiency is maximized or the torque is maximized under the same current, for each value of the current peak value Ip (or Iq) (for example, for each 1 A). Therefore, the target value setting unit 20 selects the target current phase βtarg corresponding to the present current peak value Ip (or Iq) from the data table. Then, since the d-axis current Id and the q-axis current Iq corresponding to the target current phase βtarg are understood, the d-axis voltage Vd and the q-axis voltage Vq are computed from the following Formula 11 (voltage formula of the motor), and a target voltage phase αtarg is calculated according to Formula 12.

$$\begin{pmatrix} Vd \\ Vq \end{pmatrix} = \begin{pmatrix} R & -\omega Lq \\ \omega Ld & R \end{pmatrix} \begin{pmatrix} Id \\ Iq \end{pmatrix} + \begin{pmatrix} 0 \\ \omega \psi a \end{pmatrix} \quad [\text{Formula 11}]$$

$$\alpha targ = \tan^{-1}(Vd/Vq) \quad [\text{Formula 12}]$$

When the target applied voltage phase αtarg is input from the target value setting unit 20, the voltage electrical angle instruction value setting unit 10 computes a difference between the calculated present applied voltage phase α and the target applied voltage phase αtarg, and at this time, calculates the change angle Δθv by performing a correction by the response time constant L/R of the synchronous motor M stored in advance. The response time constant to be used here may be a value obtained by computing the portion B of Formula 1 described above, based on Ld and Lq known as the motor parameters, and Id and Iq that can be calculated from the current peak value IP and the current phase β. Moreover, the voltage electrical angle instruction value setting unit 10 calculates a new applied voltage electrical angle instruction value θvtarg from the following Formula 13, using the rotational speed ω detected by the rotational speed detecting unit 7, the previous (present outputting) applied voltage electrical angle instruction value θvtarg (−1), and the change angle Δθv=(αtarg−α)×L/R. Here, symbol Δt in the formula is a control period.

$$\theta v targ = \theta v targ(-1) + [\omega \times \Delta t] + [\alpha targ - \alpha] \times L/R \quad [\text{Formula 13}]$$

According to the first setting method, since the change angle Δθv of the new applied voltage electrical angle instruction value θvtarg relative to the previous applied voltage electrical angle instruction value θvtarg (−1) is corrected by the response time constant L/R of the synchronous motor M, the applied voltage electrical angle instruction value θvtarg is updated, while maintaining the suitable response speed according to the response characteristics of the synchronous motor M.

Here, in the voltage electrical angle instruction value setting unit 10 and the target value setting unit 20, the computation using the present applied voltage phase α and the target applied voltage phase αtarg can be replaced by a computation using the calculated present applied voltage electrical angle θv and a target applied voltage electrical angle θv' based on the target applied voltage phase αtarg. In this case, [αtarg−α] in Formula 13 is replaced by [θv'−θv]. The target applied voltage electrical angle θv' can be calculated by θv'=αtarg+θm+90°.

In carrying out the correction by the response time constant L/R in the voltage electrical angle instruction value setting unit 10, it is more preferable to further perform the correction as in the following Formula 14 using the response delay coefficient considering the inertia of the synchronous motor M.

$$\theta v targ = \theta v targ(-1) + [\omega \times \Delta t] + [\alpha targ - \alpha] \times [L/R] \times J \cdot Ki/Kt \quad [\text{Formula 14}]$$

In Formula 14, J·Ki/Kt is the response delay coefficient due to inertia, symbol J is inertia of the load (kgm), symbol Ki is a constant current (V/A=Ω), and symbol Kt is a torque constant (Nm/A) known as a motor parameter. Symbol Ki has a relation of V=Ke×ω+Ki×I, and can also be replaced by the coil resistance R (Ω). Here, symbol V is an applied voltage (V), symbol Ke is an induced voltage constant (V/(rad/sec)), and symbol ω is a rotational speed (rad/sec). The J·Ki/Kt is determined in the following manner.

When a torque (Nm) due to the inertia of the synchronous motor M is set to Tj, there is a relation of the following Formula 15. Symbol ωm in the Formula is a mechanical rotational speed of the synchronous motor M (mechanical angle rotational speed rad/sec).

$$Tj = J \times d\omega m/dt \quad [\text{Formula 15}]$$

Furthermore, in a case where the applied voltage V (V) is constant, the synchronous motor M exhibits characteristics represented by the following Formula 16 in regard to the current I (A). Symbol ωm (0) in the formula is a mechanical angle rotational speed at which the current I becomes I=0 when the synchronous motor M is operated at a non-load 0 Nm at an any voltage.

$$\omega m = \omega m(0) - Ki \times I \quad [\text{Formula 16}]$$

Moreover, when the motor torque (Nm) of the synchronous motor M is set to Ti, there is a relation of the following Formula 17 between the torque Ti and the current I.

$$Ti = Kt \times I \quad [\text{Formula 17}]$$

When the load torque (Nm) applied to the output shaft of the synchronous motor M is set to Tc, in a case where Tc is constant, there is a relation of the following Formula 18.

$$Tc + Tj = Ti \quad [\text{Formula 18}]$$

When Formula 16 described above is differentiated and fitted to Formula 15, and Formula 17 and thus-modified Formula 15 are fitted to Formula 18, the following Formula 19 is obtained, and Formula 20 is derived.

$$Tc - J \times Ki \times dI/dt = Kt \times I \quad [\text{Formula 19}]$$

$$Tc = Kt \times I + J \times Ki \times dI/dt \quad [\text{Formula 20}]$$

When the transient response relating to the current I is obtained based on Formula 20, the response time constant of the current I becomes J·Ki/Kt. Therefore, by applying a filter according to Formula 14 by setting J·Ki/Kt as a response delay coefficient due to the inertia, the control stability is improved.

(B) Second Setting Method

In the second setting method, on the basis of the present flux linkage ψ of the rotor and a target flux linkage ψtarg when being operated at a target current phase, a change angle Δθv of the applied voltage electrical angle instruction value θvtarg is calculated. In general, since there is a relation of V=ω×ψ between the flux linkage ψ and the applied voltage V, when the amount of a flux linkage variation Δψ corresponding to a difference [ψtarg−ψ] between the present flux linkage ψ and the target flux linkage ψtarg is calculated and the applied voltage is controlled to increase the rotational speed ω by an amount equivalent to the amount of this flux linkage variation Δψ, as a result, the current phase reaches the target value. Since the synchronous motor M itself acts as a filter, the response characteristics of the current I corresponding to the magnetic flux variation at this time do not need to be taken into account for the response delay. Therefore, the applied voltage electrical angle instruction value θvtarg is updated, while maintaining the suitable response speed according to the response characteristics of the synchronous motor M. The amount of rotational speed variation Δω corresponding to the amount of flux linkage variation Δψ may be determined by Δω=[(ψtarg−ψ)/ψ]×ω. When the control cycle is set to Δt, the change angle Δθv of the applied voltage electrical angle instruction value θvtarg can be calculated by Δθv=Δω×Δt. In the second setting method described in detail below, (ψtarg−ψ)/ψ is indirectly calculated from the d-axis current Id.

First, as described above, the applied voltages Vu, Vv, and Vw to be applied to the stator coil of the synchronous motor M are detected by the applied voltage detecting unit 3, and the phase currents Iu, Iv, and Iw are detected by the phase current detecting unit 2. Moreover, based on the detected phase currents Iu, Iv, and Iw, and the applied voltages Vu, Vv, and Vw, the current peak value Ip and the phase current electrical angle θi are detected by the phase current peak value and electrical angle detecting unit 4, and the induced voltage peak value Ep and the induced voltage electrical angle θe are detected by the induced voltage peak value and electrical angle detecting unit 5. Based on the detected phase current peak value Ip, the phase current electrical angle θi, the induced voltage peak value Ep, and the induced voltage electrical angle θe, the rotor position θm is detected by the rotor position detecting unit 6.

In the second setting method, the target value setting unit 20 calculates a target d-axis current Idtarg based on the current peak value Ip (or the q-axis current Ip is also possible in the same manner as described above) that is input from the rotor position detecting unit 6. Specifically, the target value setting unit 20 has a data table created in advance from the known parameters of the synchronous motor M and stored in the memory, and the data table includes a target d-axis current Idtarg corresponding to an optimal current lead angle (target current phase βtarg) at which the efficiency is maximized or the torque is maximized under the same current, for each value (for example, for each 1 A) of the current peak value Ip (or Iq). Therefore, the target value setting unit 20 selects the target d-axis current Idtarg corresponding to the present current peak value Ip (or Iq) from the data table, and inputs the target d-axis current Idtarg to the voltage electrical angle instruction value setting unit 10.

Figure 4:
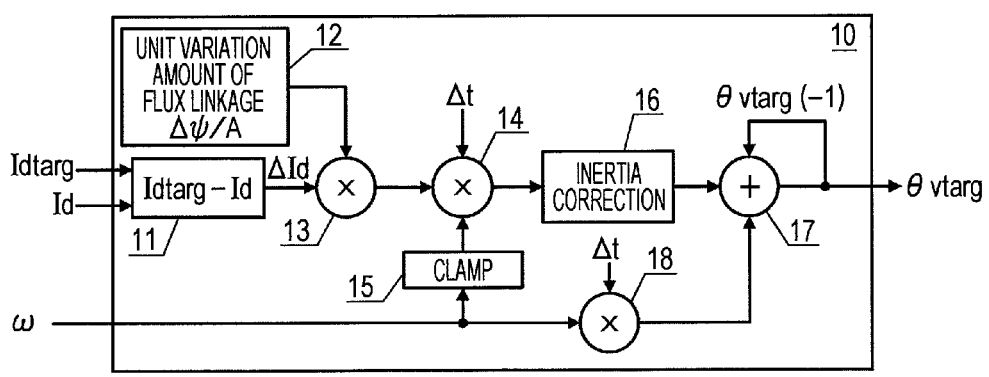
FIG. 4 is a block diagram illustrating a voltage electrical angle instruction value setting unit according to a second setting method.

The voltage electrical angle instruction value setting unit 10 receives the present d-axis current Id from the rotor position detecting unit 6, and calculates the d-axis current difference ΔId between the present d-axis current Id and the target d-axis current Idtarg. Since the current phase β is detected by the rotor position detecting unit 6, the present d-axis current Id can be calculated from the current peak value Ip and the current phase β. This operation may be performed by the rotor position detecting unit 6, or may be performed by the voltage electrical angle instruction value setting unit 10 that receives the present current peak value Ip and the current phase β from the rotor position detecting unit 6. When the d-axis current difference ΔId is calculated, the voltage electrical angle instruction value setting unit 10 calculates the amount of flux linkage variation Δψ of the rotor corresponding to the d-axis current difference ΔId, and calculates the change angle Δθv based on the amount of flux linkage variation Δψ and the rotational speed ω detected by the rotational speed detecting unit 7. FIG. 4 illustrates an internal block diagram of the voltage electrical angle instruction value setting unit 10 according to the second setting method.

In the voltage electrical angle instruction value setting unit 10, the present d-axis current Id and the target d-axis current Idtarg are input to the d-axis current difference calculating unit 11, and the d-axis current difference ΔId is calculated by ΔId=Idtarg−Id. Meanwhile, in a ψ variation amount storage unit 12, a unit variation amount Δψ/A (%: for example, 70/4096) of the flux linkage ψ when the d-axis current Id changes by 1 A is stored as one of the motor parameters, and in a multiplying unit 13, the unit variation amount Δψ/A and the d-axis current difference ΔId are computed, and the amount of the flux linkage variation Δψ corresponding to the d-axis current difference ΔId is calculated. The amount of the linkage flux variation Δψ is input to a multiplying unit 14, and a computation is carried out with the present rotational speed ω that is input from the rotational speed detecting unit 7 and the control period Δt. The present rotational speed ω at this time is clamped at the maximum value according to the response time constant L/R by a clamp portion 15. In other words, ω (electrical angle rotational number) is clamped by 1/(L/R) Hz. Thereby, oscillation of instruction value can be more reliably prevented.

In the case of this embodiment, the change angle Δθv=Δψ×ω×Δt that is output from the multiplying unit 14 is input to an inertia correcting unit 16. From the same reason as the first setting method described above, the inertia correcting unit 16 corrects the change angle Δθv using the response delay coefficient J·Ki/Kt considering the inertia of the synchronous motor M. The change angle Δθv×J·Ki/Kt after the inertia correction is input to an adding unit 17. The adding unit 17 carries out a computation with ω×Δt obtained by multiplying the present rotational speed ω by the control period Δt using a multiplying unit 18, the applied voltage electrical angle instruction value θvtarg (−1) of the previous, that is, once before control cycle, and the change angle Δθv×J·Ki/Kt after the inertia correction, and outputs a new applied voltage electrical angle instruction value θvtarg expressed by the following Formula 21.

$$\theta vtarg=\theta vtarg(-1)+[\omega\omega\Delta t]+[\Delta\theta v\times J\cdot Ki/Kt] \quad \text{[Formula 21]}$$

Here, the applied voltage electrical angle instruction value θvtarg in a case of omitting the inertia correcting unit 16 is expressed by the following Formula 22.

$$\theta vtarg=\theta vtarg(-1)+[\omega\times\Delta t]+\Delta\theta v \quad \text{[Formula 22]}$$

REFERENCE SIGNS LIST 1 inverter driving unit
2 phase current detecting unit
3 applied voltage detecting unit
4 phase current peak value and electrical angle detecting unit
5 induced voltage peak value and electrical angle detecting unit
6 rotor position detecting unit
7 rotational speed detecting unit
8 voltage instruction value setting unit
10 voltage electrical angle instruction value setting unit
20 target value setting unit

The invention claimed is:
1. An applied-voltage electrical angle setting method for a synchronous motor, the method comprising:
   detecting an applied voltage applied to a stator coil of the synchronous motor, and a current flowing through the stator coil according to the applied voltage;

calculating a present applied voltage phase (or an applied voltage electrical angle) and calculating a current peak value based on the detected applied voltage and current, and calculating a target current phase based on the current peak value followed by calculating a target applied voltage phase (or a target applied voltage electrical angle) corresponding to the target current phase; and calculating a new applied voltage electrical angle instruction value, based on a change angle obtained by correcting a difference between the present applied voltage phase (or the applied voltage electrical angle) and the target applied voltage phase (or the target applied voltage electrical angle) by a response time constant of the synchronous motor, a rotational speed calculated based on the detected applied voltage and current, and the previous applied voltage electrical angle instruction value.

2. The applied-voltage electrical angle setting method according to claim 1,
wherein the change angle is further corrected by a response delay coefficient due to inertia.

3. A motor control device comprising:
a current detecting unit that detects a current flowing through a stator coil of a synchronous motor;
an applied voltage detecting unit that detects an applied voltage to be applied to the stator coil;
a current peak value and electrical angle detecting unit that detects a current peak value and a current electrical angle based on the current detected by the current detecting unit;
an induced voltage peak value and electrical angle detecting unit that detects an induced voltage peak value and an induced voltage electrical angle based on the current detected by the current detecting unit and the applied voltage detected by the applied voltage detecting unit;
a rotor position detecting unit that detects a rotor position of the synchronous motor, using a rotor position calculation formula which includes the current electrical angle or the induced voltage electrical angle as a variable, and includes a current phase or an induced voltage phase obtained based on at least two of the current peak value, the induced voltage peak value, and a difference between the induced voltage electrical angle and the current electrical angle as a variable;
a rotational speed detecting unit that detects a rotational speed based on the rotor position detected by the rotor position detecting unit;
a target value setting unit that calculates a target current phase based on a current peak value detected by the phase current peak value and electrical angle detecting unit, and calculates a target applied voltage phase (or a target applied voltage electrical angle) based on the target current phase; and
a voltage electrical angle instruction value setting unit that calculates a new applied voltage electrical angle instruction value, based on a change angle obtained by obtaining a difference between the present applied voltage phase (or the applied voltage electrical angle) calculated based on the applied voltage detected by the applied voltage detecting unit and the target applied voltage phase (or the target applied voltage electrical angle) and correcting the difference by a response time constant of the synchronous motor, a rotational speed detected by the rotational speed detecting unit, and the previous applied voltage electrical angle instruction value.

4. The motor control device according to claim 3,
wherein the voltage electrical angle instruction value setting unit further corrects the change angle by the response delay coefficient due to inertia.

5. An applied-voltage electrical angle setting method for a synchronous motor, the method comprising:
detecting an applied voltage applied to a stator coil of the synchronous motor, and a current flowing through the stator coil according to the applied voltage;
calculating an amount of flux linkage variation corresponding to a difference between a present flux linkage of a rotor and a target flux linkage corresponding to a target current phase based on the detected applied voltage and current;
calculating a change angle, based on a rotational speed calculated based on the detected applied voltage and current, and the amount of flux linkage variation; and
calculating a new applied voltage electrical angle instruction value, based on the calculated rotational speed, the change angle, and the previous applied voltage electrical angle instruction value.

6. The applied-voltage electrical angle setting method according to claim 5,
wherein the change angle is corrected by a response delay coefficient due to inertia.

7. A motor control device comprising:
a current detecting unit that detects a current flowing through a stator coil of a synchronous motor;
an applied voltage detecting unit that detects an applied voltage applied to the stator coil;
a current peak value and electrical angle detecting unit that detects a current peak value and a current electrical angle, based on the current detected by the current detecting unit;
an induced voltage peak value and electrical angle detecting unit that detects an induced voltage peak value and an induced voltage electrical angle, based on the current detected by the current detecting unit and the applied voltage detected by the applied voltage detecting unit;
a rotor position detecting unit that detects a rotor position of the synchronous motor, using a rotor position calculation formula that includes the current electrical angle or the induced voltage electrical angle as a variable, and includes the current phase or the induced voltage phase obtained based on at least two of the current peak value, the induced voltage peak value, and a difference between the induced voltage electrical angle and the current electrical angle as a variable;
a rotational speed detecting unit that detects a rotational speed based on a rotor position detected by the rotor position detecting unit;
a target value setting unit that calculates a target d-axis current based on the current peak value; and
a voltage electrical angle instruction value setting unit that calculates a d-axis current difference between a present d-axis current obtained based on the current peak value and the current phase and the target d-axis current, calculates an amount of flux linkage variation of a rotor corresponding to the d-axis current difference, and computes a new applied voltage electrical angle instruction value, based on a change angle calculated based on the amount of flux linkage variation and the rotational speed, the rotational speed, and the previous applied voltage electrical angle instruction value.

8. The motor control device according to claim 7,
wherein the voltage electrical angle instruction value setting unit corrects the change angle by a response delay coefficient due to inertia.

* * * * *